United States Patent [19]

Robb

[11] Patent Number: 5,491,583

[45] Date of Patent: Feb. 13, 1996

[54] INFRARED LENS SYSTEMS

[75] Inventor: Paul N. Robb, Sunnyvale, Calif.

[73] Assignee: Lockheed Missiles & Space Company, Inc., Sunnyvale, Calif.

[21] Appl. No.: 261,164

[22] Filed: Jun. 17, 1994

[51] Int. Cl.[6] .............................. G02B 13/14; G02B 5/08; G02B 1/06

[52] U.S. Cl. .......................... 359/356; 359/358; 359/665

[58] Field of Search .................................... 359/355, 356, 359/358, 665, 666, 708, 797, 676

[56] References Cited

U.S. PATENT DOCUMENTS

| | | | |
|---|---|---|---|
| 4,958,919 | 9/1990 | Sigler | 359/665 |
| 5,020,889 | 6/1991 | Mercado et al. | 359/665 |
| 5,033,831 | 7/1991 | Sigler | 359/665 |

OTHER PUBLICATIONS

"Selection of optical glasses" by Paul N. Robb: 1985 International Lens Design Conference, Jun. 10–23, 1985, a Reprint from the SPIE PROCEEDINGS, vol. 554, pp. 60–75.

"Refractive indices of liquids in the ultraviolet and infrared" by Paul Robb, SPIE PROCEEDINGS REPRINT from Passive Materials for Optical Elements II, Jul. 14–15, 1993, vol. 2018, pp. 200–205.

*Primary Examiner*—Paul M. Dzierzynski
*Assistant Examiner*—Audrey Chang
*Attorney, Agent, or Firm*—Robert P. Sabath; Edward J. Radlo

[57] ABSTRACT

Lens systems (68, 78, 88, 98, 108, 118) with first and second rigid lens elements (70,71;80,81;90,91;100,101;110,111;120,121) and a liquid lens element (76, 86, 96, 106, 116, 126) therebetween are provided. The first and second rigid lens elements and the liquid lens elements co-act with each other to cause the lens system to have substantially diffraction limited performance over a continuous infrared wavelength band, wherein the first and second rigid lens elements and the liquid lens element are configured and positioned with respect to each other according to a selection of particular designs and design forms.

12 Claims, 12 Drawing Sheets

FIG_1
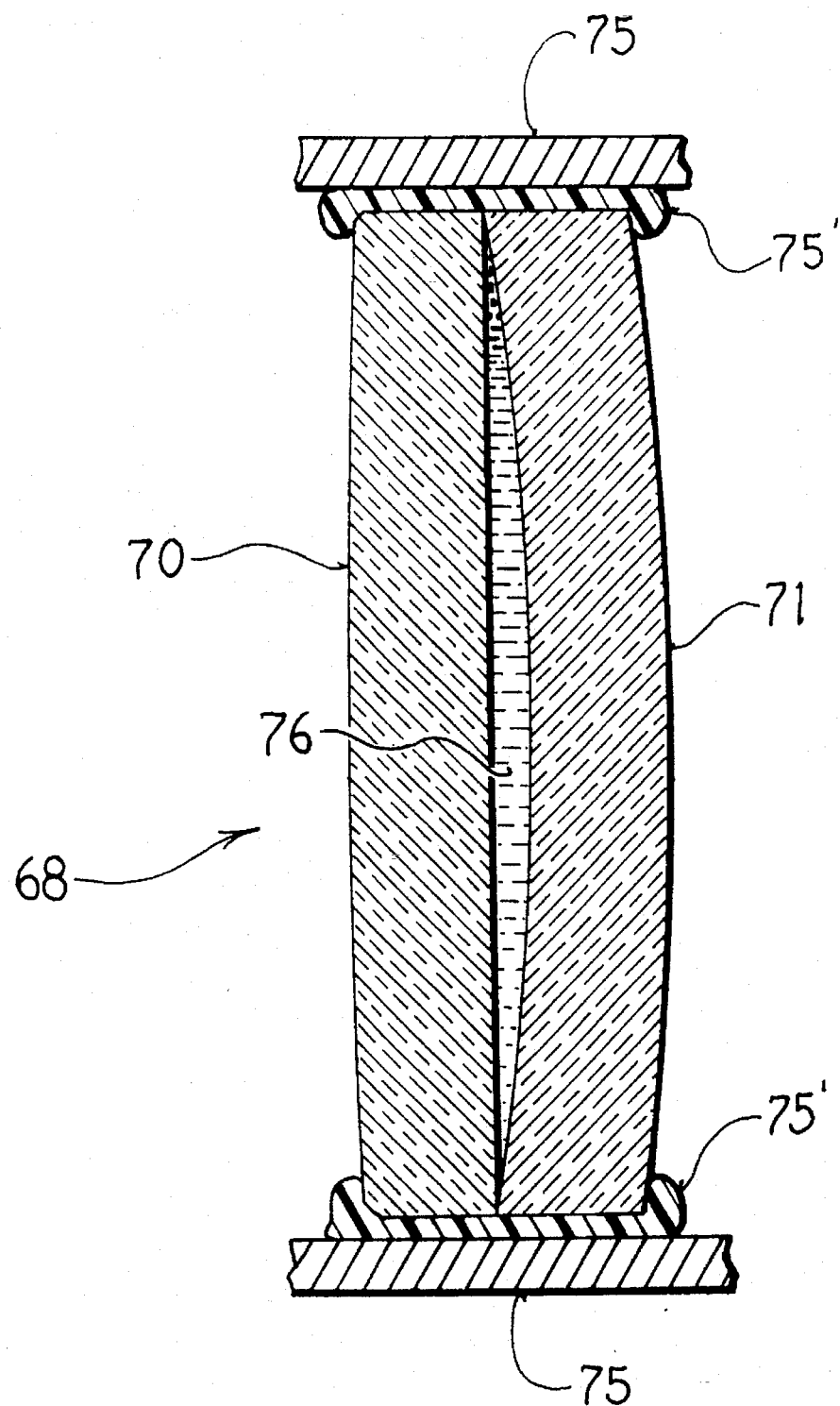

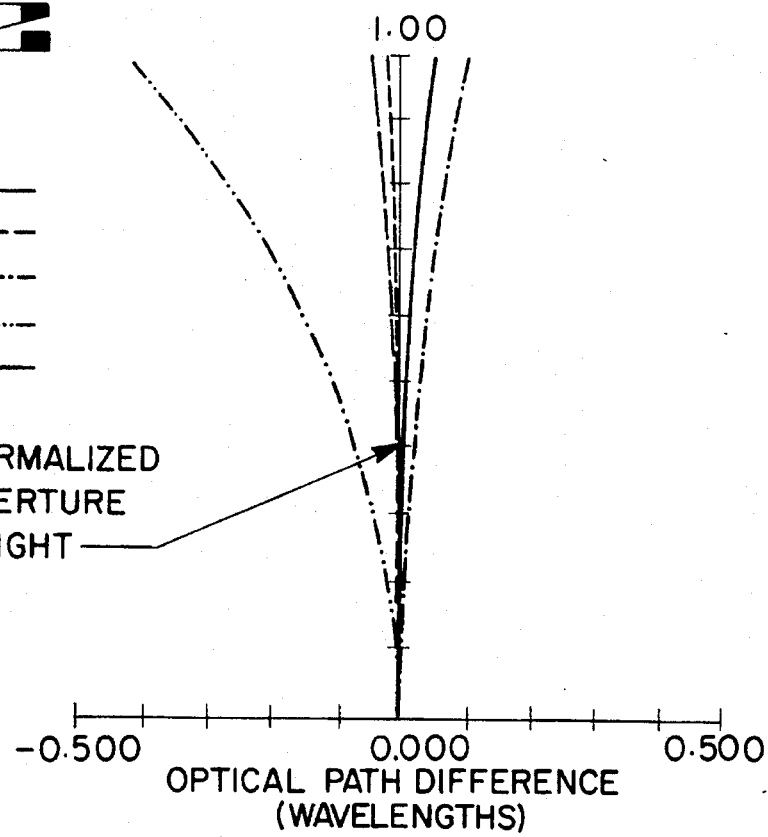
FIG_2
| NO. λ (MICRONS) |
|---|
| 1.0000 |
| 0.9000 |
| 1.5000 |
| 0.7000 |
| 2.5000 |
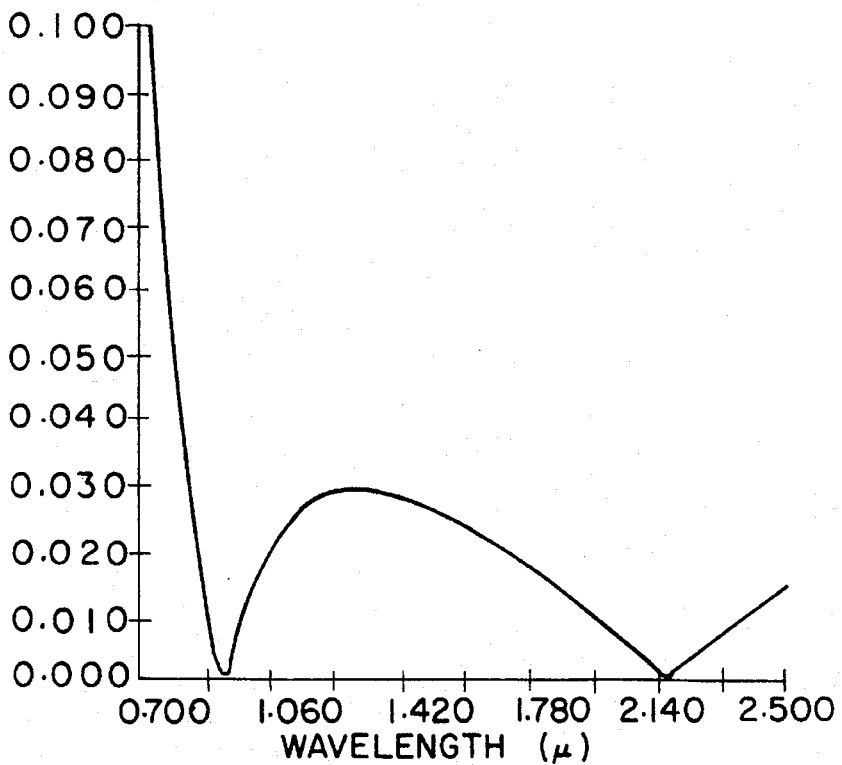
FIG_3

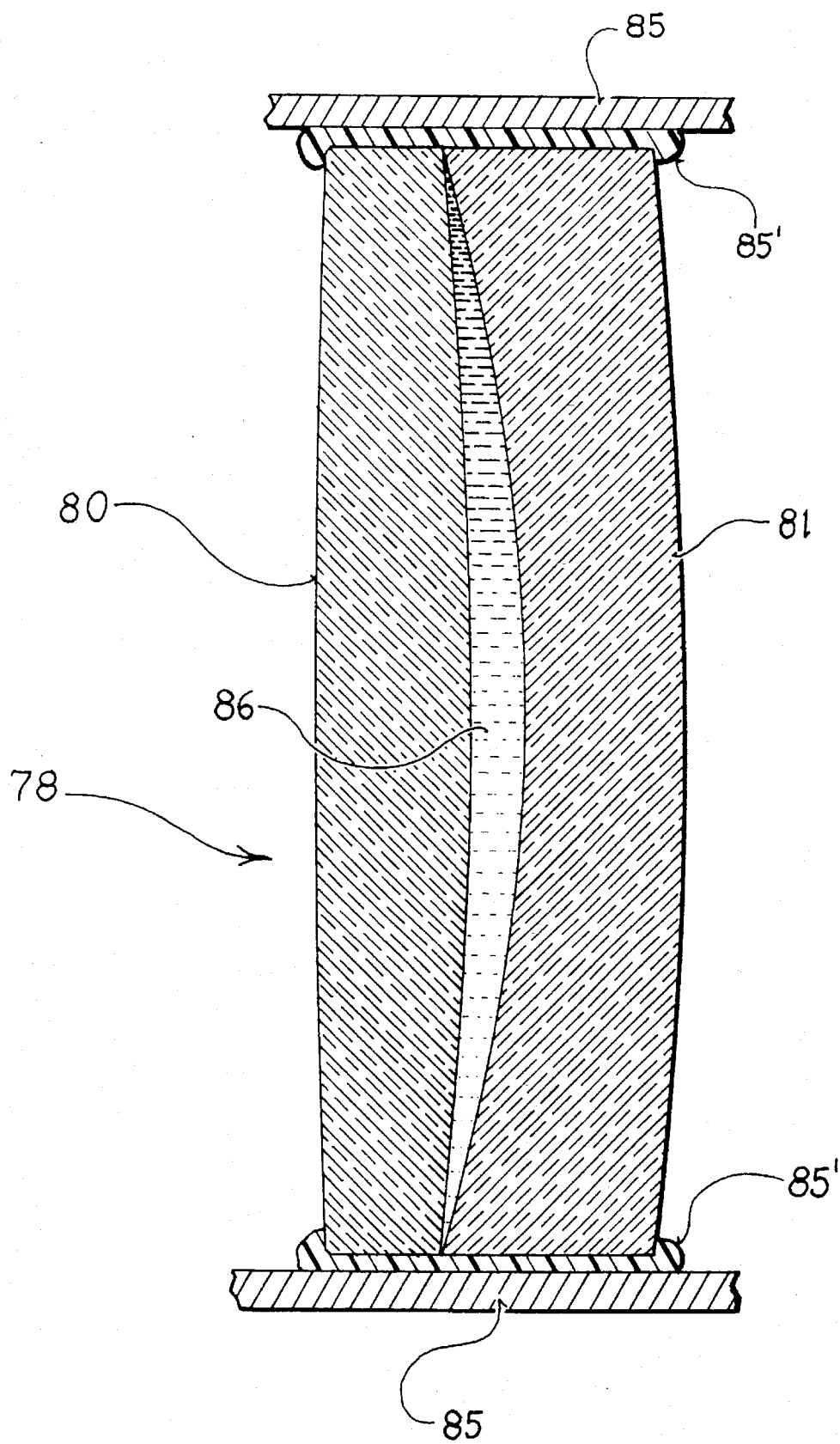
FIG_4

FIG_5
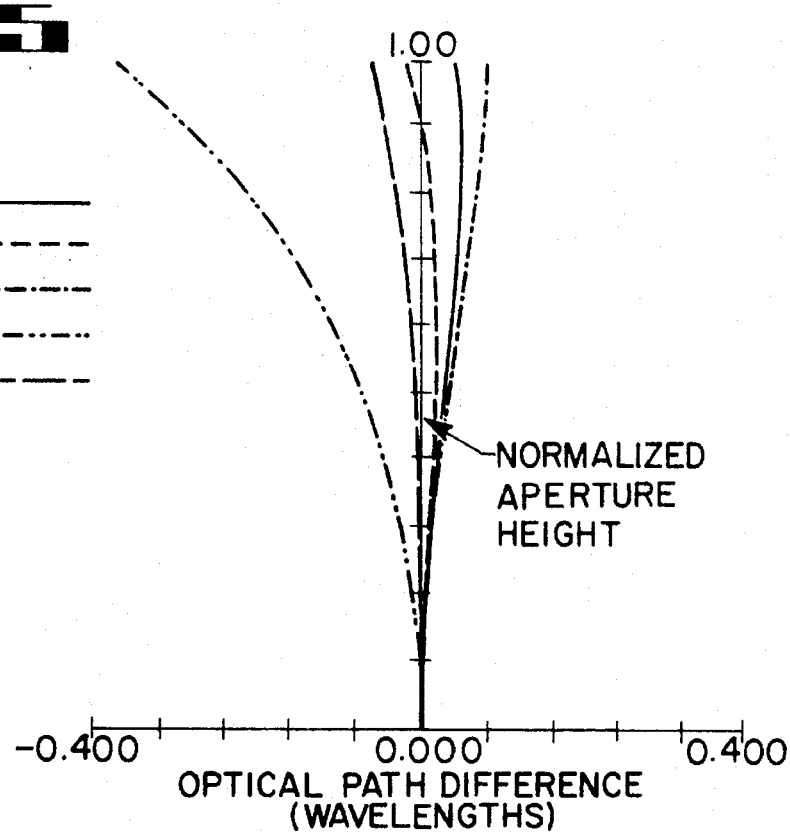
NO. λ (MICRONS)
1.0000 ———
0.9000 - - - -
0.5000 —··—··—
0.7000 —···—···
0.5000 — — —
FIG_6
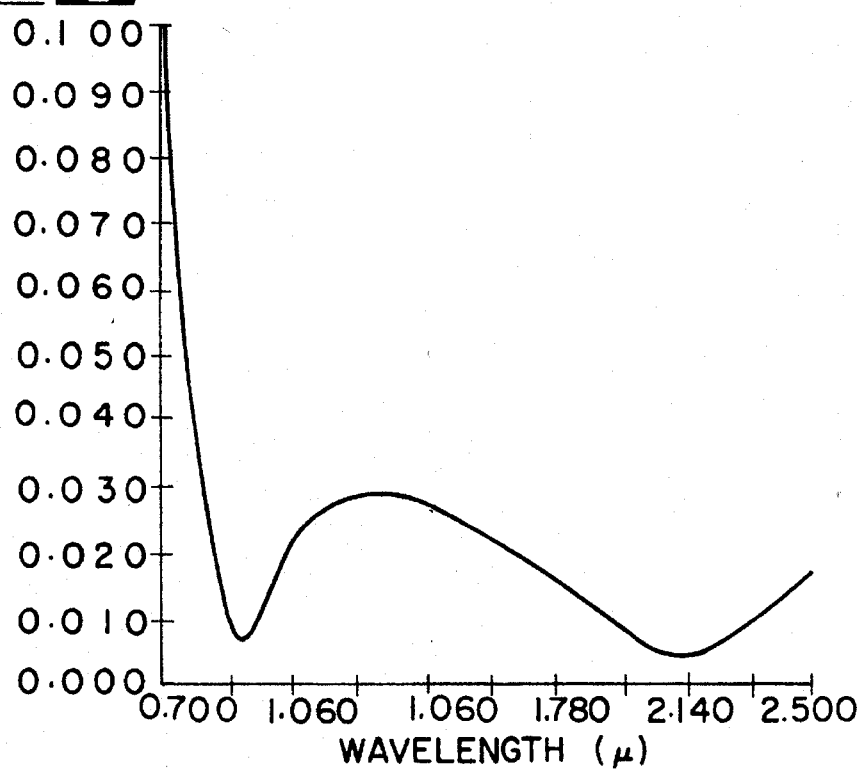

FIG_7
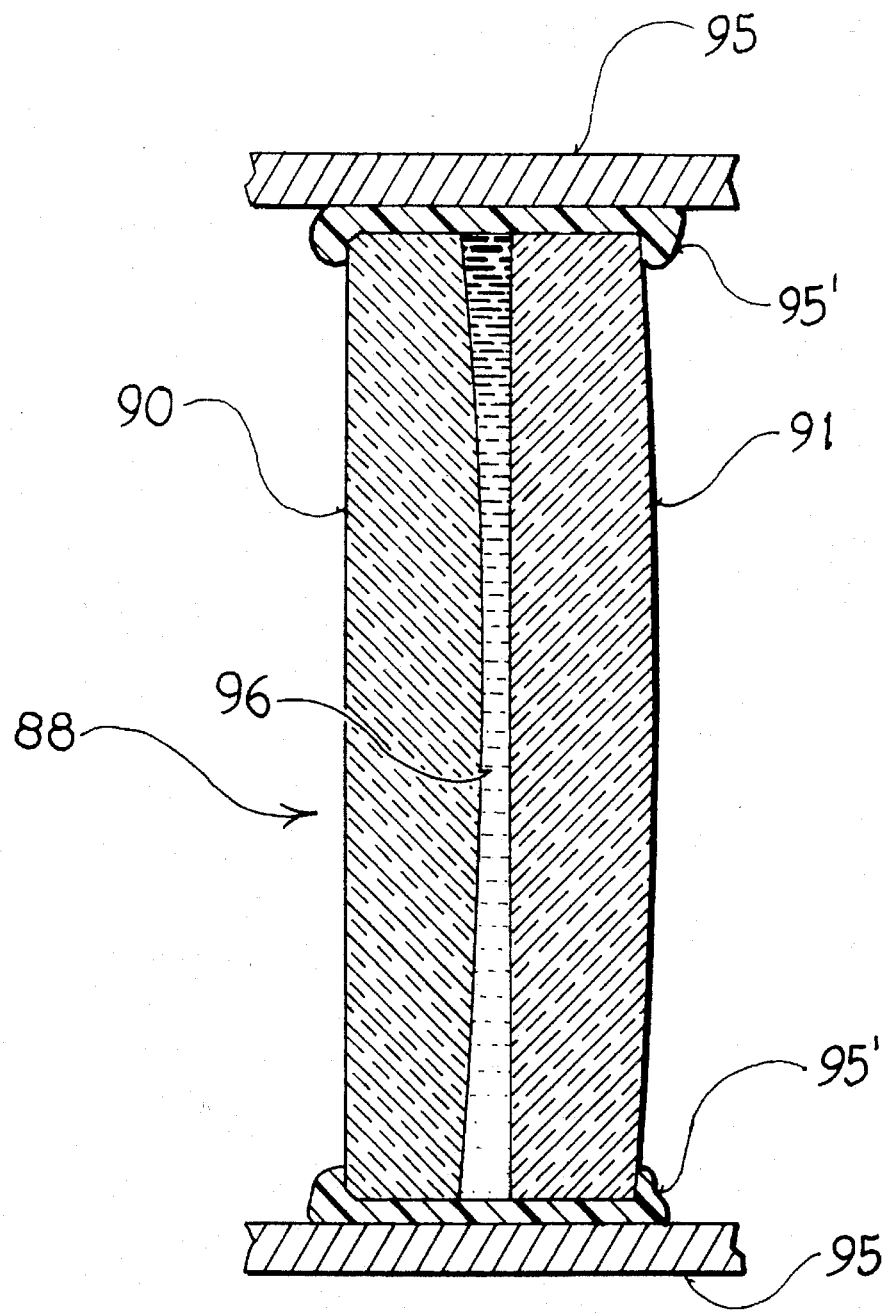

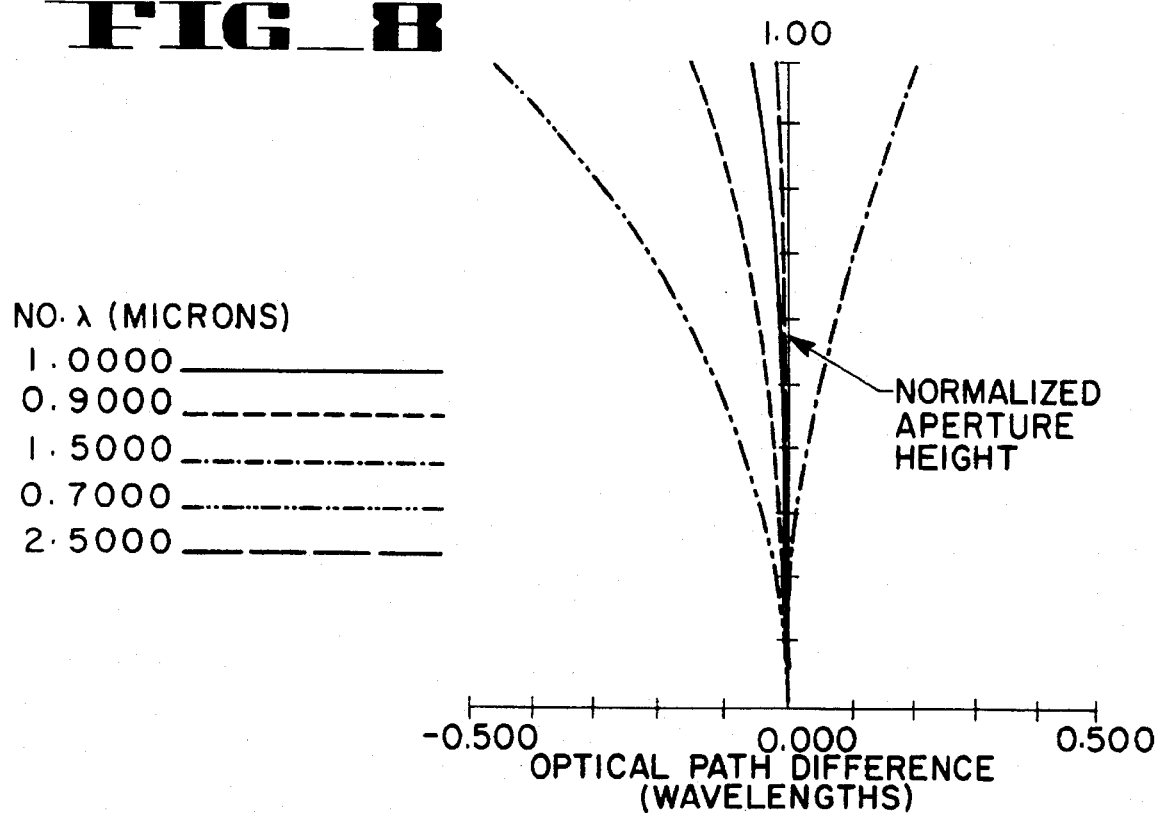
FIG_8
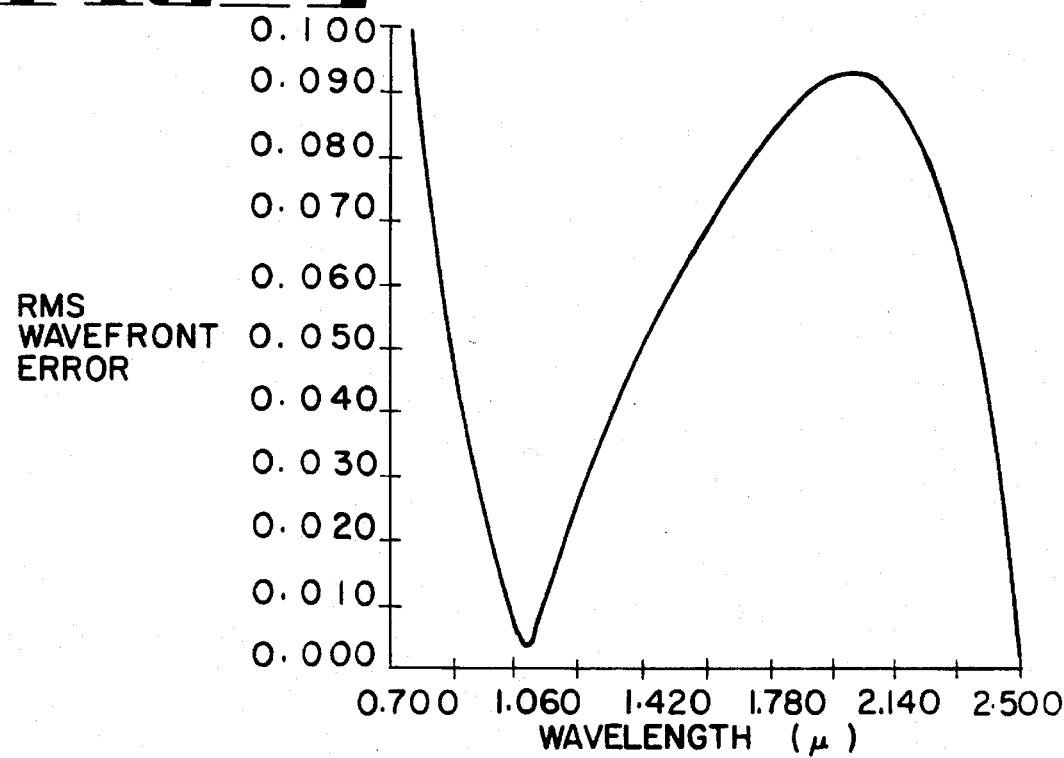
FIG_9

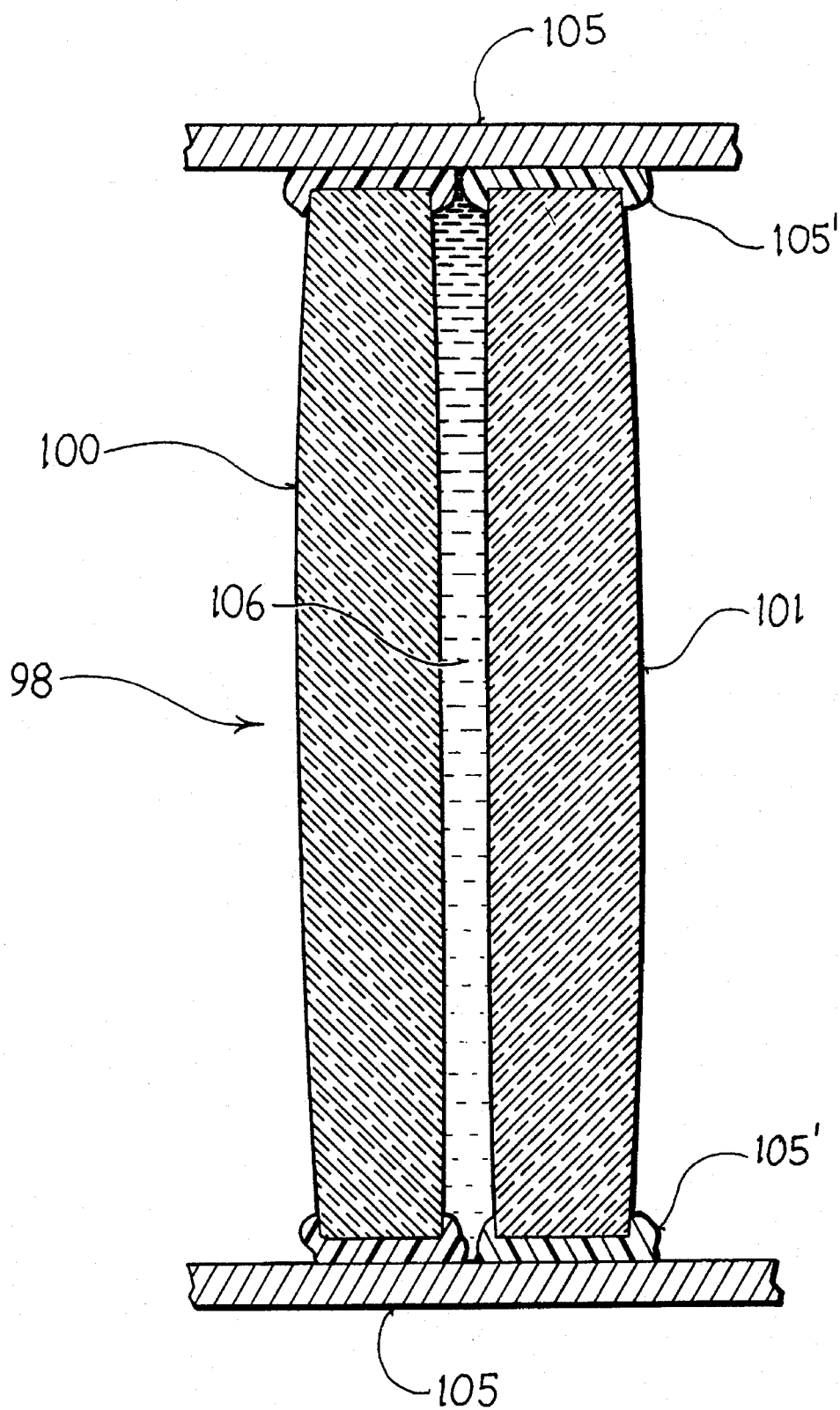

FIG_11
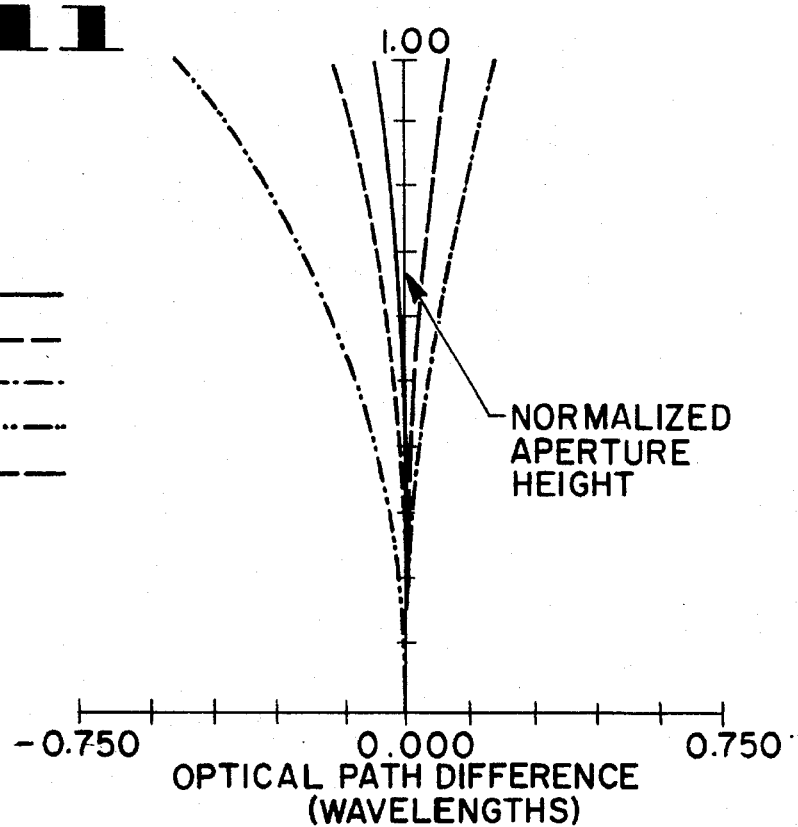
| NO. λ (MICRONS) | |
|---|---|
| 1.0000 | ———— |
| 0.9000 | — — — |
| 1.5000 | —··—··— |
| 0.7000 | —···—···— |
| 2.5000 | — — — |
FIG_12
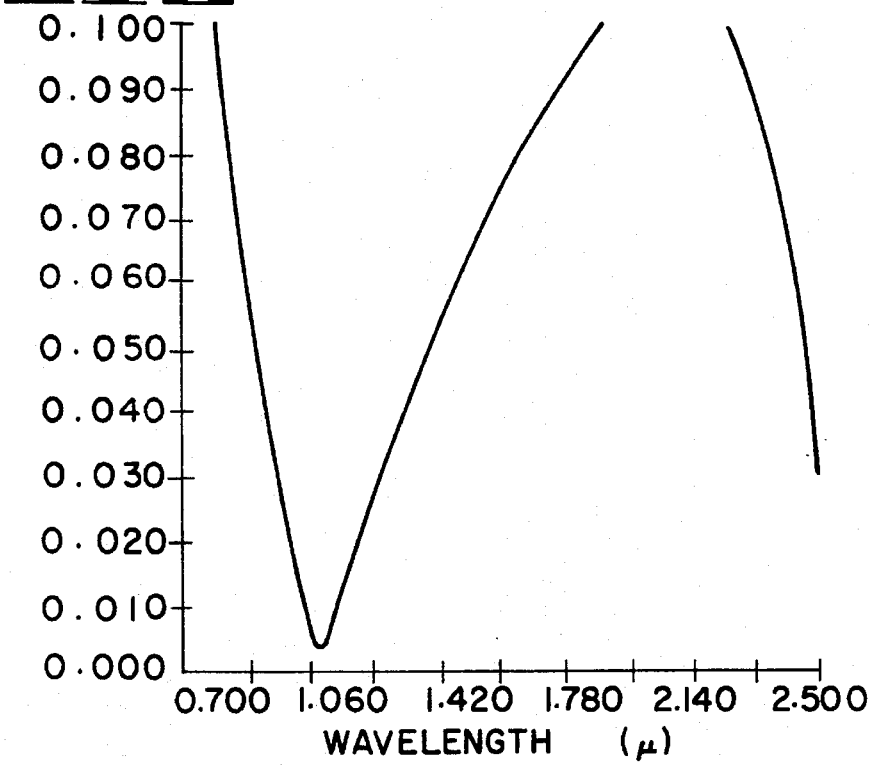

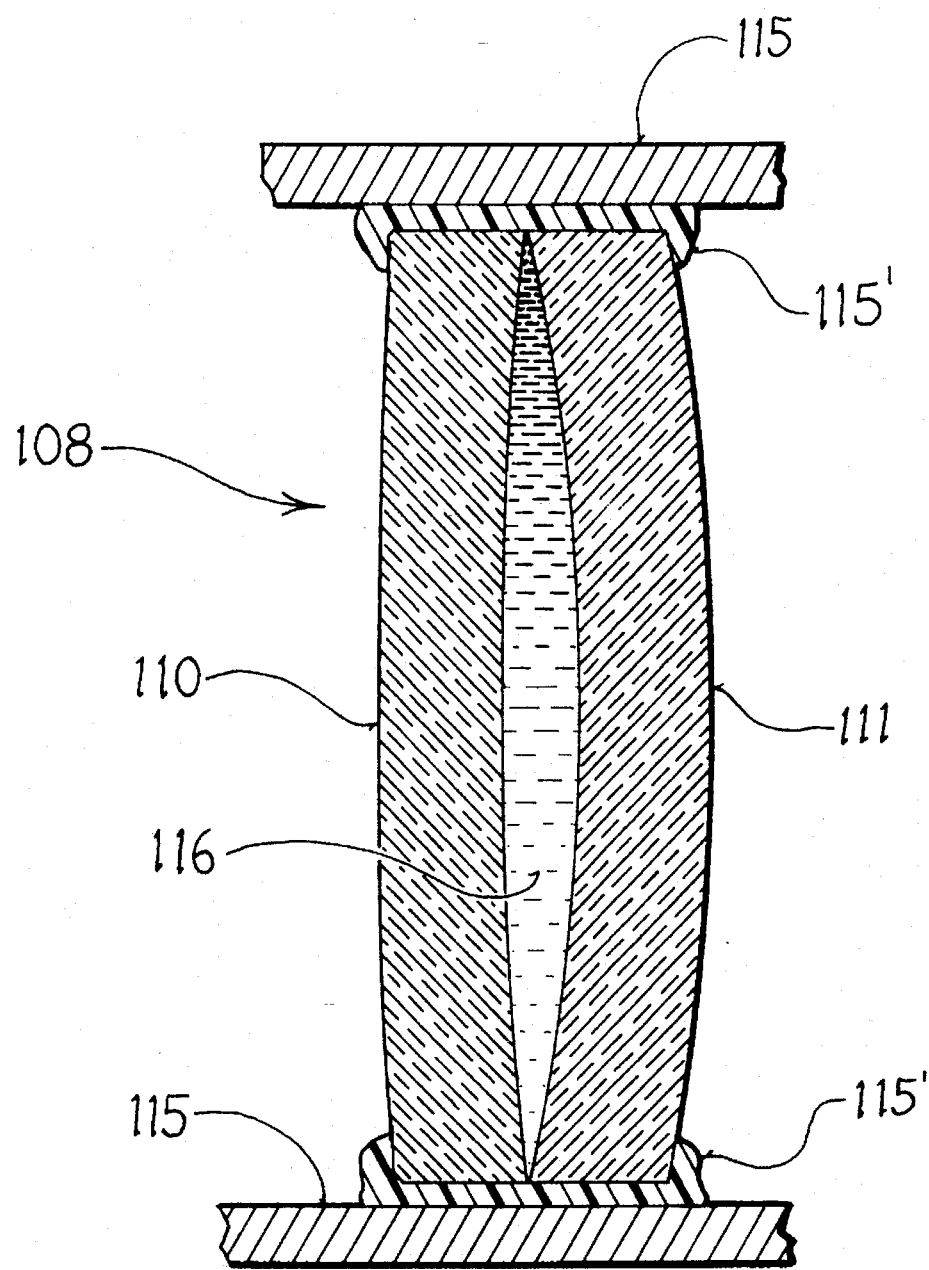
FIG_13

FIG_14
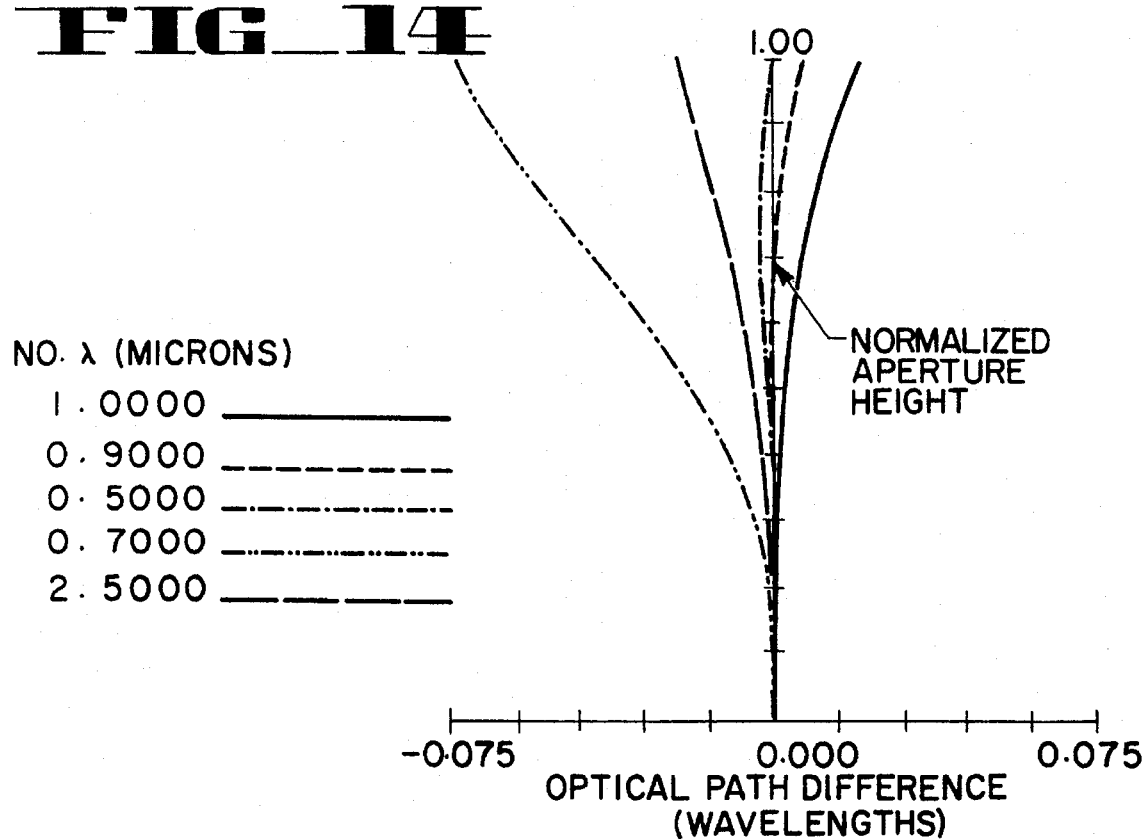
| NO. | λ (MICRONS) |
|---|---|
| 1. | 0000 ———— |
| 0. | 9000 - - - - - |
| 0. | 5000 -··-··-·· |
| 0. | 7000 -···-···- |
| 2. | 5000 — — — |
FIG_15
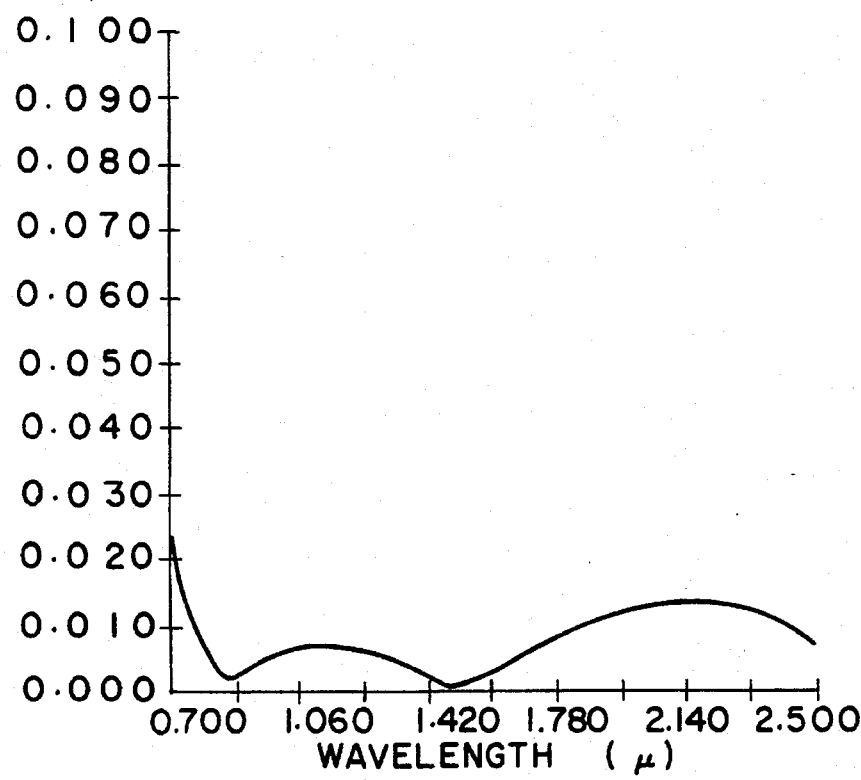

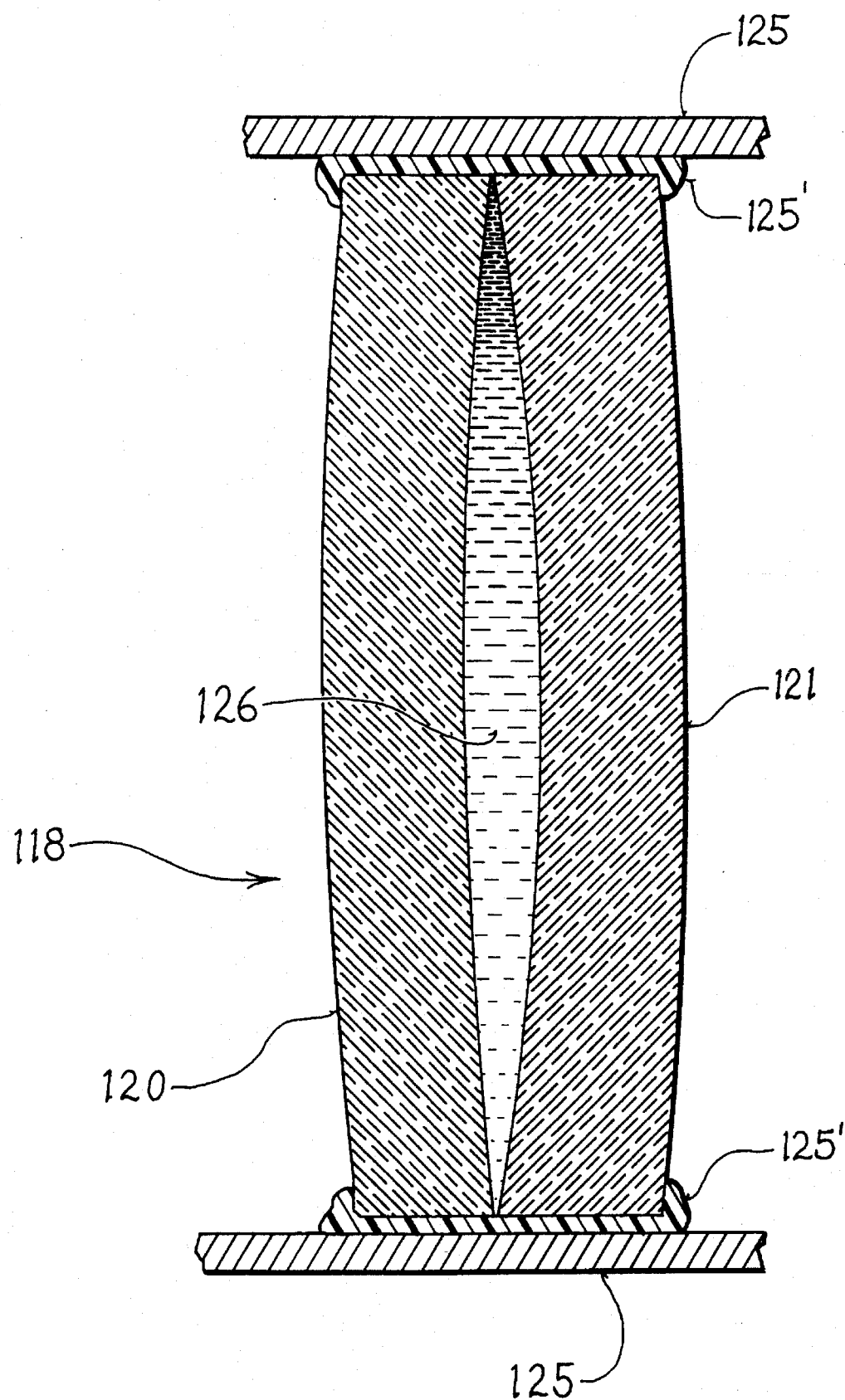
FIG_16

FIG_17
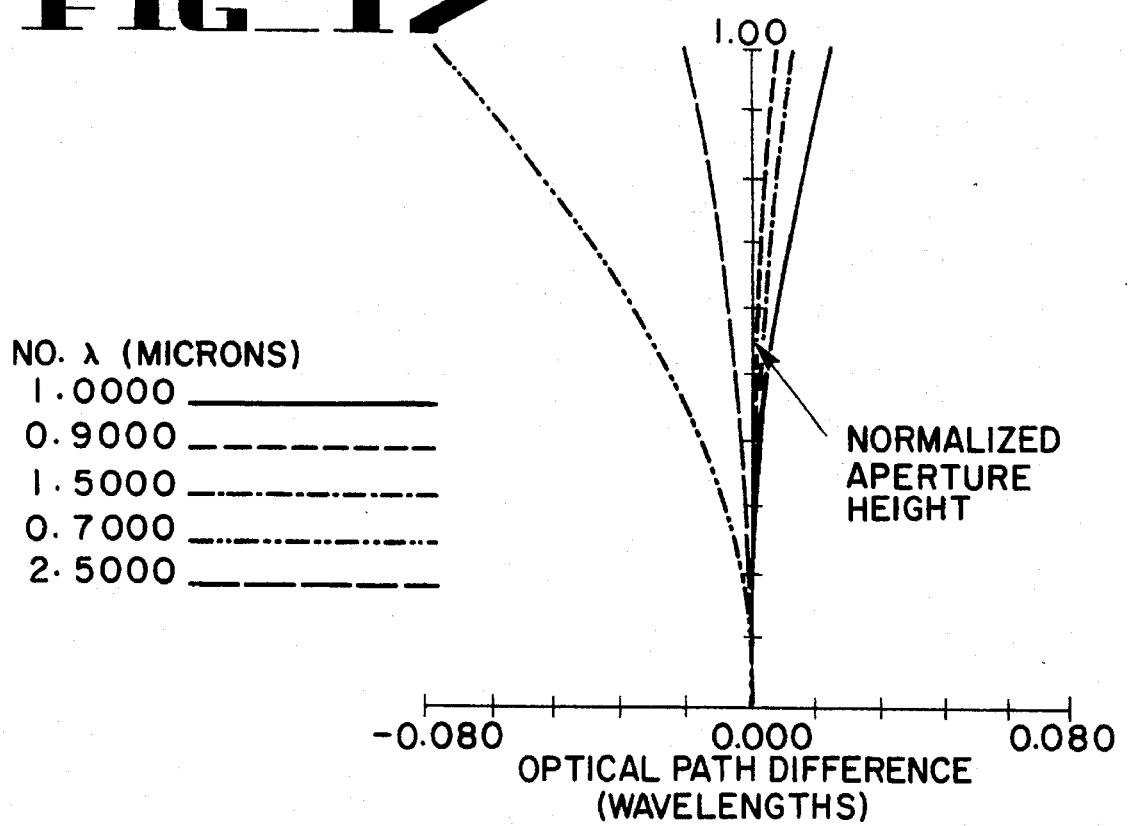
FIG_18
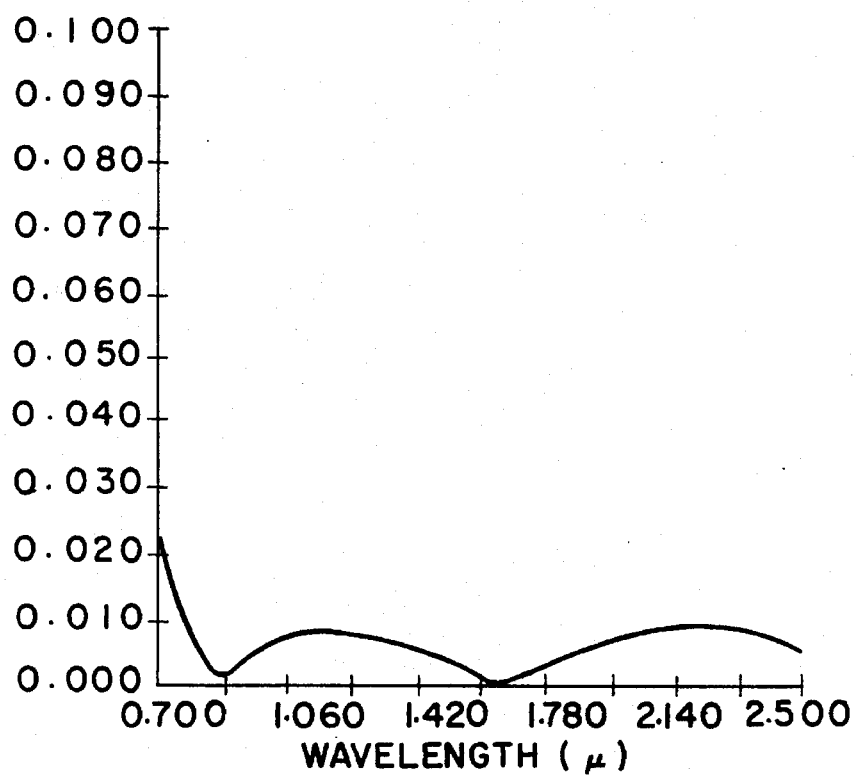

INFRARED LENS SYSTEMS

TECHNICAL FIELD

This invention relates generally to optical systems that are well-corrected for chromatic aberration, and more particularly to lens systems that exhibit substantially diffraction-limited performance over a continuous wavelength band through the infrared (IR) regions of the electromagnetic spectrum.

BACKGROUND OF THE INVENTION

In order to design an optical system so as to have a specified degree of correction for chromatic aberration, it is necessary to use an appropriate combination of optical materials for the refractive elements of the system. A technique is described in U.S. Pat. No. 5,020,889 for identifying appropriate combinations of optical materials to use in designing optical systems that are to have a specified degree of color correction.

Techniques are described in U.S. Pat. Nos. 4,958,919 and 5,033,831 for selecting combinations of liquids and glasses for use as the lens elements of optical systems that are to be well-corrected for chromatic aberration.

Unless an appropriate combination of optical materials is used for the refractive elements of an optical system, it would not be possible to achieve a specified degree of correction for chromatic aberration for the system. However, the selection of an appropriate combination of optical materials is not a sufficient condition for achieving the specified degree of correction for chromatic aberration. In addition to using an appropriate combination of optical materials, the designer must also determine an appropriate design form for the system—i.e., an appropriate set of geometrical relationships for the refractive elements that comprise the system.

Until recently, techniques as described in the above-cited references for selecting appropriate combinations of optical materials for use in designing optical systems that are corrected for chromatic aberration over specified wavelength ranges had generally not been applied to the design of lens systems incorporating a liquid optical element in the infrared wavelength band, because there has been practically a complete absence of refractive index measurements at infrared wavelengths for optically useful liquids.

Recent collaboration between researchers at the Lockheed Palo Alto Research Laboratories in Palo Alto, Calif. and the Vavilov State Optical Institute in St. Petersburg, Russia has resulted in the measurement of refractive indices for a number of liquids at infrared wavelengths. The data obtained thereby has made possible the use of liquids to design optical systems that are well-corrected for chromatic aberration over a broad wavelength band through the near infrared region of the electromagnetic spectrum.

SUMMARY OF THE INVENTION

The present invention is directed toward design forms for lens systems (68, 78, 88, 98, 108, 118) which are well-corrected for chromatic aberration as well as for monochromatic aberrations and the chromatic variation of the monochromatic aberrations, and are therefore substantially diffraction-limited over a broad wavelength band extending within the infrared region of the electromagnetic spectrum.

It may be desirable to provide designs and design forms for lens systems (68, 78, 88, 98, 108, 118) that are well-corrected for chromatic aberration and substantially diffraction-limited over a broad wavelength band extending through selected ranges in the infrared region of the electromagnetic spectrum.

It may further be desirable to provide designs and design forms for lens systems using a liquid lens element (76, 86, 96, 106, 116, 126) to achieve correction for chromatic aberration over a broad wavelength band extending through the infrared region of the electromagnetic spectrum. Such lens systems may for example include first and second solid lens (70, 71; 80, 81; 90, 91; 100, 101; 110, 111; 120, 121) according to a particular prescription of the invention, which form the sides of a container for a central liquid lens element. The solid lens elements are coaxially disposed along the optical axis, and are mounted so as to constrain the liquid lens element therebetween.

The present invention is disclosed herein in terms of a number of exemplary embodiments of lens systems in which certain liquids, which are available as common chemicals of high purity, usually termed "spectral grade," are used for the liquid lens elements. Mounting of the solid lens elements in order to contain a central fluid lens element under the present invention is accomplished with a flexible inert adhesive material (75', 85', 95', 105', 115', 125') such as fluor. silicone for example. One kind of fluorsilicone material which can be employed is X36141 material from Dow Corning of Midland, Mich. The flexibility of the sealing material permits effective liquid containment under expansion conditions caused by temperature fluctuations without the need for a reservoir. A technique for mounting a pair of solid lens elements so as to contain a liquid lens element therebetween is disclosed in co-pending U.S. patent application Ser. No. 08/014,596 filed on Feb. 8, 1993.

BRIEF DESCRIPTION OF THE DRAWINGS

FIG. 1 shows a profile drawing of an embodiment of the present invention, which comprises first and second solid lens elements made of sapphire;

FIG. 2 is a plot of the optical path difference versus the normalized aperture height for five selected wavelengths in the case of an embodiment of the invention according to FIG. 1;

FIG. 3 is a plot of rms wavefront error versus wavelength for a selected infrared wavelength range for the embodiment of the invention shown in FIG. 1;

FIG. 4 shows a profile drawing of a next embodiment of the present invention, which comprises first and second solid lens elements made of fused silica;

FIG. 5 is a plot of the optical path difference versus the normalized aperture height for five selected wavelengths in the case of an embodiment of the invention according to FIG. 4;

FIG. 6 is a plot of rms wavefront error versus wavelength for a selected infrared wavelength range for the embodiment of the invention shown in FIG. 4;

FIG. 7 shows a profile drawing of a next embodiment of the present invention, which comprises first and second solid lens elements made of sapphire;

FIG. 8 is a plot of the optical path difference versus the normalized aperture height for five selected wavelengths in the case of an embodiment of the invention according to FIG. 7;

FIG. 9 is a plot of rms wavefront error versus wavelength for a selected infrared wavelength range for the embodiment of the invention shown in FIG. 7;

FIG. 10 shows a profile drawing of a next embodiment of the present invention, which comprises first and second solid lens elements made of fused silica;

FIG. 11 is a plot of the optical path difference versus the normalized aperture height for five selected wavelengths in the case of an embodiment of the invention according to FIG. 10;

FIG. 12 is a plot of rms wavefront error versus wavelength for a selected infrared wavelength range for the embodiment of the invention shown in FIG. 10;

FIG. 13 shows a profile drawing of a next embodiment of the present invention, which comprises first and second solid lens elements made of sapphire;

FIG. 14 is a plot of the optical path difference versus the normalized aperture height for five selected wavelengths in the case of an embodiment of the invention according to FIG. 13;

FIG. 15 is a plot of rms wavefront error versus wavelength for a selected infrared wavelength range for the embodiment of the invention shown in FIG. 13;

FIG. 16 shows a profile drawing of a next embodiment of the present invention, which comprises first and second solid lens elements made of fused silica;

FIG. 17 is a plot of the optical path difference versus the normalized aperture height for five selected wavelengths in the case of an embodiment of the invention according to FIG. 16; and FIG. 18 is a plot of rms wavefront error versus wavelength for a selected infrared wavelength range for the embodiment of the invention shown in FIG. 16.

DETAILED DESCRIPTION OF THE PREFERRED EMBODIMENTS

First Embodiment

FIG. 1 shows a profile drawing of an embodiment of the present invention, which comprises a lens arrangement 68 including first and second solid lens elements 70 and 71 respectively, each of which is made of sapphire. The sapphire lens elements 70 and 71 can be obtained from, e.g., Solon Technologies Inc. of Solon, Ohio. Lens arrangement 68 includes a fixture 75 in which are coaxially mounted lens elements 70 and 71 with a flexible material 75', such as fluorosilicone for example, along a common optic axis. Lens arrangement 68 further includes a liquid element 76 contained within fixture 75. The liquid element according to the present embodiment is carbon tetrachloride. According to the United States Mil Spec system for identifying optical materials, carbon tetrachloride is identified by the code designation "459487."

FIG. 2 is a plot of the optical path difference versus the normalized aperture height for five selected wavelengths, showing that the maximum wavefront error for any one of the plotted wavelengths is less than 0.42 wavelengths for the embodiment of FIG. 19. FIG. 3 is a plot of rms wavefront error for the embodiment of FIG. 19, versus wavelength for an infrared wavelength range from 0.70 to 2.50 microns. As indicated, for the embodiment of FIG. 19, the rms wavefront error is less than 0.122 wave, and the average rms wavefront error is 0.021 wave, over the range from 0.70 to 2.50 micron.

The lens arrangement shown in FIG. 1 has an optical prescription (i.e., a design form) specified in tabular form as follows:

TABLE 1

| Surface No. | Radius (inches) | Thickness (inches) | $N_d$ | $V_d$ | Material |
|---|---|---|---|---|---|
| 1 | 2.408983 | 0.014031 | 1.768239 | 72.01 | Sapphire |
| 2 | −6.241043 | 0.004845 | 1.459453 | 48.75 | 459487 |
| 3 | −0.265632 | 0.014031 | 1.768239 | 72.01 | Sapphire |
| 4 | −0.424980 | 1.001170 | | | Air | where the surfaces of the lens elements are numbered consecutively from left to right along the optic axis in accordance with optical design convention. Thus, surface No. 1 is the left surface of the first solid lens element. Surface No. 2 is both the right surface of the first solid element and the left surface of the liquid lens element. Surface No. 3 is both the right surface of the liquid lens element and the left surface of the second solid lens element. The aperture stop is at surface No. 1. The radius listed for each lens surface in the table above is the radius of curvature expressed in inches. In accordance with convention, the radius of curvature is positive if the center of curvature of the surface lies to the right of the surface, and negative if the center of curvature of the surface lies to the left of the surface. The thickness listed for each lens surface is the thickness expressed in inches of the lens element bounded on the left by the surface. The thickness of each lens element is measured along the optic axis. The column headed $N_d$ in the table refers to the index of refraction of the lens element bounded on the left by the indicated surface at the wavelength of the sodium d spectral line (i.e., 0.58756 micron). The column headed $V_d$ refers to the Abbe number for the lens element bounded on the left by that surface. The index of refraction of an optical material varies with wavelength. The indices of refraction for the two lo different materials comprising the solid and liquid lens elements of the lens system indicated, at five representative wavelengths (i.e., $N_1$ at 1.00 micron, $N_2$ at 0.90 micron, $N_3$ at 1.50 micron, $N_4$ at 0.70 micron, $N_5$ at 2.50 micron) are tabulated as follows:

TABLE 2

| Material | $N_1$ | $N_2$ | $N_3$ | $N_4$ | $N_5$ |
|---|---|---|---|---|---|
| Sapphire | 1.755737 | 1.757772 | 1.747114 | 1.763252 | 1.726239 |
| $CCl_4$ | 1.450368 | 1.451490 | 1.447525 | 1.455324 | 1.445252 |

The lens system of the embodiment indicated has been evaluated above for each of the above-specified wavelengths. In particular, a graphical indication of performance of the lens system at the particular wavelengths as been provided by a plot of optical path difference as a function of normalized aperture height for the specified wavelength. As shown above, plots of optical path difference as a function of normalized aperture height are shown for the indicated lens system for each of the same five wavelengths for which indices of refraction are tabulated. It can be determined from the curves plotted that the maximum optical path difference for the lens system shown throughout the selected range of wavelengths is less than 0.42 waves at any point on the aperture. Further shown above, the root-mean-square (rms) wavefront error of the lens system shown has been plotted throughout a selected portion of the IR spectrum. According to the information shown, the lens system is well corrected throughout the selected range of the IR spectrum.

Second Embodiment

FIG. 4 shows a profile drawing of another embodiment of the present invention, which comprises a lens arrangement 78 including first and second solid lens elements 80 and 81 respectively, each of which is made of fused silica. The fused silica lens elements can be obtained from, e.g., Heraeus Amersil, Inc. of Duluth, Ga. Lens arrangement 78 includes a fixture 85 in which are coaxially mounted lens elements 80 and 81 with a flexible material 85', such as fluorosilicone for example, along a common optic axis. Lens arrangement 78 further includes a liquid element 86 contained within fixture 85. The liquid element according to the present embodiment is carbon tetrachloride. According to the United States Mil Spec system for identifying optical materials, carbon tetrachloride is identified by the code designation "459487."

FIG. 5 is a plot of the optical path difference versus the normalized aperture height for five selected wavelengths, showing that the maximum wavefront error for any one of the plotted wavelengths is less than 0.37 wavelengths for the embodiment of FIG. 22. FIG. 6 is a plot of rms wavefront error for the embodiment of FIG. 22, versus wavelength for an infrared wavelength range from 0.70 to 2.50 microns. As indicated, for the embodiment of FIG. 22, the rms wavefront error is less than 0.109 wave, and the average rms wavefront error is 0.021 wave, over the range from 0.70 to 2.50 micron.

The lens arrangement shown in FIG. 4 has an optical prescription (i.e., a design form) specified in tabular form as follows:

TABLE 3

| Surface No. | Radius (inches) | Thickness (inches) | $N_d$ | $V_d$ | Material |
|---|---|---|---|---|---|
| 1 | 1.358504 | 0.013810 | 1.458464 | 67.82 | Fused Silica |
| 2 | −0.489942 | 0.004676 | 1.459453 | 48.75 | 459487 |
| 3 | −0.187082 | 0.013810 | 1.458464 | 67.82 | Fused Silica |
| 4 | −0.668690 | 0.988123 | | | Air | where the surfaces of the lens elements are numbered consecutively from left to right along the optic axis in accordance with optical design convention. Thus, surface No. 1 is the left surface of the first solid lens element. Surface No. 2 is both the right surface of the first solid element and the left surface of the liquid lens element. Surface No. 3 is both the right surface of the liquid lens element and the left surface of the second solid lens element. The aperture stop is at surface No. 1. The radius listed for each lens surface in the table above is the radius of curvature expressed in inches. In accordance with convention, the radius of curvature is positive if the center of curvature of the surface lies to the right of the surface, and negative if the center of curvature of the surface lies to the left of the surface. The thickness listed for each lens surface is the thickness expressed in inches of the lens element bounded on the left by the surface. The thickness of each lens element is measured along the optic axis. The column headed $N_d$ in the table refers to the index of refraction of the lens element bounded on the left by the indicated surface at the wavelength of the sodium d spectral line (i.e., 0.58756 micron). The column headed $V_d$ refers to the Abbe number for the lens element bounded on the left by that surface. The index of refraction of an optical material varies with wavelength. The indices of refraction for the two different materials comprising the solid and liquid lens elements of the lens system indicated, at five representative wavelengths over a selected micron range (i.e., $N_1$ at 1.00 micron, $N_2$ at 0.90 micron, $N_3$ at 1.50 micron, $N_4$ at 0.70 micron, $N_5$ at 2.50 micron) are tabulated as follows:

TABLE 4

| Material | $N_1$ | $N_2$ | $N_3$ | $N_4$ | $N_5$ |
|---|---|---|---|---|---|
| Fused Silica | 1.450417 | 1.451754 | 1.444618 | 1.455293 | 1.429802 |
| $CCl_4$ | 1.450368 | 1.451490 | 1.447525 | 1.455324 | 1.445252 |

The lens system of the embodiment indicated has been evaluated above for each of the above-specified wavelengths. In particular, a graphical indication of performance of the lens system at the particular wavelengths as been provided by a plot of optical path difference as a function of normalized aperture height for the specified wavelength. As shown above, plots of optical path difference as a function of normalized aperture height are shown for the indicated lens system for each of the same five wavelengths for which indices of refraction are tabulated. It can be determined from the curves plotted that the maximum optical path difference for the lens system shown throughout the selected range of wavelengths is less than 0.37 waves at any point on the aperture. Further shown above, the root-mean-square (rms) wavefront error of the lens system shown has been plotted throughout a selected portion of the infrared spectrum. According to the information shown, the lens system is well corrected throughout the selected range of the infrared spectrum.

Third Embodiment

FIG. 7 shows a profile drawing of another embodiment of the present invention, which comprises a lens arrangement 88 including first and second solid lens elements 90 and 91 respectively, each of which is made of sapphire. The sapphire lens elements 90 and 91 can be obtained from, e.g., Solon Technologies Inc. of Solon, Ohio. Lens arrangement 88 includes a fixture 95 in which are coaxially mounted lens elements 90 and 91 with a flexible material 95', such as fluorosilicone for example, along a common optic axis. Lens arrangement 88 further includes a liquid element 96 contained within fixture 95. The liquid element according to the present embodiment is hexane. According to the United States Mil Spec system for identifying optical materials, hexane is identified by the code designation "375580."

FIG. 8 is a plot of the optical path difference versus the normalized aperture height for five selected wavelengths, showing that the maximum wavefront error for any one of the plotted wavelengths is less than 0.48 wavelengths for the embodiment of FIG. 7. FIG. 9 is a plot of rms wavefront error for the embodiment of FIG. 7, versus wavelength for an infrared wavelength range from 0.70 to 2.50 microns. As indicated, for the embodiment of FIG. 7, the rms wavefront error is less than 0.139 wave, and the average rms wavefront error is 0.06 wave, over the range from 0.70 to 2.50 micron.

The lens arrangement shown in FIG. 7 has an optical prescription (i.e., a design form) specified in tabular form as follows:

TABLE 5

| Surface No. | Radius (inches) | Thickness (inches) | $N_d$ | $V_d$ | Material |
| --- | --- | --- | --- | --- | --- |
| 1 | 4.784631 | 0.013722 | 1.768239 | 72.01 | Sapphire |
| 2 | −0.833969 | 0.004738 | 1.375217 | 58.03 | 375580 |
| 3 | −2.427737 | 0.013722 | 1.768239 | 72.01 | Sapphire |
| 4 | −1.395965 | 0.993165 | | | Air | where the surfaces of the lens elements are numbered consecutively from left to right along the optic axis in accordance with optical design convention. Thus, surface No. 1 is the left surface of the first solid lens element. Surface No. 2 is both the right surface of the first solid element and the left surface of the liquid lens element. Surface No. 3 is both the right surface of the liquid lens element and the left surface of the second solid lens element. The aperture stop is at surface No. 1. The radius listed for each lens surface in the table above is the radius of curvature expressed in inches. In accordance with convention, the radius of curvature is positive if the center of curvature of the surface lies to the right of the surface, and negative if the center of curvature of the surface lies to the left of the surface. The thickness listed for each lens surface is the thickness expressed in inches of the lens element bounded on the left by the surface. The thickness of each lens element is measured along the optic axis. The column headed $N_d$ in the table refers to the index of refraction of the lens element bounded on the left by the indicated surface at the wavelength of the sodium d spectral line (i.e., 0.58756 micron). The column headed $V_d$ refers to the Abbe number for the lens element bounded on the left by that surface. The index of refraction of an optical material varies with wavelength. The indices of refraction for the two different materials comprising the solid and liquid lens elements of the lens system indicated, at five representative wavelengths (i.e., $N_1$ at 1.00 micron, $N_2$ at 0.90 micron, $N_3$ at 1.50 micron, $N_4$ at 0.70 micron, $N_5$ at 2.50 micron) are tabulated as follows:

TABLE 6

| Material | $N_1$ | $N_2$ | $N_3$ | $N_4$ | $N_5$ |
| --- | --- | --- | --- | --- | --- |
| Sapphire | 1.755737 | 1.757772 | 1.747114 | 1.763252 | 1.726239 |
| Hexane | 1.368913 | 1.369709 | 1.366748 | 1.372366 | 1.306288 |

The lens system of the embodiment indicated has been evaluated above for each of the above-specified wavelengths. In particular, a graphical indication of performance of the lens system at the particular wavelengths as been provided by a plot of optical path difference as a function of normalized aperture height for the specified wavelength. As shown above, plots of optical path difference as a function of normalized aperture height are shown for the indicated lens system for each of the same five wavelengths for which indices of refraction are tabulated. It can be determined from the curves plotted that the maximum optical path difference for the lens system shown throughout the selected range of wavelengths is less than 0.48 waves at any point on the aperture. Further shown above, the root-mean-square (rms) wavefront error of the lens system shown has been plotted throughout a selected portion of the infrared spectrum. According to the information shown, the lens system is well corrected throughout the selected range of the infrared spectrum.

Fourth Embodiment

FIG. 10 shows a profile drawing of another embodiment of the present invention, which comprises a lens arrangement 98 including first and second solid lens elements 100 and 101 respectively, each of which is made of fused silica. The fused silica lens elements can be obtained from, e.g., Heraeus Amersil, Inc. of Duluth, Ga. Lens arrangement 98 includes a fixture 105 in which are coaxially mounted lens elements 100 and 101 with a flexible material 105', such as fluorosilicone for example, along a common optic axis. Lens arrangement 98 further includes a liquid element 106 contained within fixture 105. The liquid element according to the present embodiment is hexane. According to the United States Mil Spec system for identifying optical materials, hexane is identified by the code designation "375580."

FIG. 11 is a plot of the optical path difference versus the normalized aperture height for five selected wavelengths, showing that the maximum wavefront error for any one of the plotted wavelengths is less than 0.54 wavelengths for the embodiment of FIG. 10. FIG. 12 is a plot of rms wavefront error for the embodiment of FIG. 10, versus wavelength for an infrared wavelength range from 0.70 to 2.50 microns. As indicated, for the embodiment of FIG. 10, the rms wavefront error is less than 0.156 wave, and the average rms wavefront error is 0.071 wave, over the range from 0.70 to 2.50 micron.

The lens arrangement shown in FIG. 10 has an optical prescription (i.e., a design form) specified in tabular form as follows:

TABLE 7

| Surface No. | Radius (inches) | Thickness (inches) | $N_d$ | $V_d$ | Material |
| --- | --- | --- | --- | --- | --- |
| 1 | 0.724396 | 0.013654 | 1.458464 | 67.82 | Fused Silica |
| 2 | −4.508088 | 0.004623 | 1.375217 | 58.03 | 375580 |
| 3 | 1.930710 | 0.013654 | 1.458464 | 67.82 | Fused Silica |
| 4 | −1.394357 | 0.986876 | | | Air | where the surfaces of the lens elements are numbered consecutively from left to right along the optic axis in accordance with optical design convention. Thus, surface No. 1 is the left surface of the first solid lens element. Surface No. 2 is both the right surface of the first solid element and the left surface of the liquid lens element. Surface No. 3 is both the right surface of the liquid lens element and the left surface of the second solid lens element. The aperture stop is at surface No. 1. The radius listed for each lens surface in the table above is the radius of curvature expressed in inches. In accordance with convention, the radius of curvature is positive if the center of curvature of the surface lies to the right of the surface, and negative if the center of curvature of the surface lies to the left of the surface. The thickness listed for each lens surface is the thickness expressed in inches of the lens element bounded on the left by the surface. The thickness of each lens element is measured along the optic axis. The column headed $N_d$ in the table refers to the index of refraction of the lens element bounded on the left by the indicated surface at the wavelength of the sodium d spectral line (i.e., 0.58756 micron). The column headed $V_d$ refers to the Abbe number for the lens element bounded on the left by that surface. The index of refraction of an optical material varies with wavelength. The indices of refraction for the two different materials comprising the solid and liquid lens elements of the lens system indicated, at five representative wavelengths over a selected micron range (i.e., $N_1$ at 1.00 micron, $N_2$ at 0.90 micron, $N_3$ at 1.50 micron, $N_4$ at 0.70 micron, $N_5$ at 2.50 micron) are tabulated as follows:

TABLE 8

| Material | $N_1$ | $N_2$ | $N_3$ | $N_4$ | $N_5$ |
|---|---|---|---|---|---|
| Fused Silica | 1.450417 | 1.451754 | 1.444618 | 1.455293 | 1.429802 |
| Hexane | 1.368913 | 1.369709 | 1.366748 | 1.372366 | 1.306288 |

The lens system of the embodiment indicated has been evaluated above for each of the above-specified wavelengths. In particular, a graphical indication of performance of the lens system at the particular wavelengths as been provided by a plot of optical path difference as a function of normalized aperture height for the specified wavelength. As shown above, plots of optical path difference as a function of normalized aperture height are shown for the indicated lens system for each of the same five wavelengths for which indices of refraction are tabulated. It can be determined from the curves plotted that the maximum optical path difference for the lens system shown throughout the selected range of wavelengths is less than 0.54 waves at any point on the aperture. Further shown above, the root-mean-square (rms) wavefront error of the lens system shown has been plotted throughout a selected portion of the infrared spectrum. According to the information shown, the lens system is well corrected throughout the selected range of the infrared spectrum.

Fifth Embodiment

FIG. 13 shows a profile drawing of another embodiment of the present invention, which comprises a lens arrangement 108 including first and second solid lens elements 110 and 111 respectively, each of which is made of sapphire. The sapphire lens elements 110 and 111 can be obtained from, e.g., Solon Technologies Inc. of Solon, Ohio. Lens arrangement 108 includes a fixture 115 in which are coaxially mounted lens elements 110 and 111 with a flexible material 115', such as fluorosilicone for example, along a common optic axis. Lens arrangement 108 further includes a liquid element 116 contained within fixture 115. The liquid element according to the present embodiment is perfluoromethyldecaline. Perfluoromethyldecalin is identified by the code designation "312.02."

FIG. 14 is a plot of the optical path difference versus the normalized aperture height for five selected wavelengths, showing that the maximum wavefront error for any one of the plotted wavelengths is less than 0.07 wavelengths for the embodiment of FIG. 13. FIG. 15 is a plot of rms wavefront error for the embodiment of FIG. 13, versus wavelength for an ultraviolet wavelength range from 0.70 to 2.50 microns. As indicated, for the embodiment of FIG. 13, the rms wavefront error is less than 0.022 wave, and the average rms wavefront error is 0.0077 wave, over the range from 0.70 to 2.50 micron.

The lens arrangement shown in FIG. 13 has an optical prescription (i.e., a design form) specified in tabular form as follows:

TABLE 9

| Surface No. | Radius (inches) | Thickness (inches) | $N_d$ | $V_d$ | Material |
|---|---|---|---|---|---|
| 1 | 0.579185 | 0.014015 | 1.768239 | 72.01 | Sapphire |
| 2 | 0.465793 | 0.009988 | 1.317242 | 102.26 | 312.02 |
| 3 | −0.206232 | 0.014015 | 1.768239 | 72.01 | Sapphire |

TABLE 9-continued

| Surface No. | Radius (inches) | Thickness (inches) | $N_d$ | $V_d$ | Material |
|---|---|---|---|---|---|
| 4 | −0.275157 | 1.000413 | | | Air | where the surfaces of the lens elements are numbered consecutively from left to right along the optic axis in accordance with optical design convention. Thus, surface No. 1 is the left surface of the first solid lens element. Surface No. 2 is both the right surface of the first solid element and the left surface of the liquid lens element. Surface No. 3 is both the right surface of the liquid lens element and the left surface of the second solid lens element. The aperture stop is at surface No. 1. The radius listed for each lens surface in the table above is the radius of curvature expressed in inches. In accordance with convention, the radius of curvature is positive if the center of curvature of the surface lies to the right of the surface, and negative if the center of curvature of the surface lies to the left of the surface. The thickness listed for each lens surface is the thickness expressed in inches of the lens element bounded on the left by the surface. The thickness of each lens element is measured along the optic axis. The column headed $N_d$ in the table refers to the index of refraction of the lens element bounded on the left by the indicated surface at the wavelength of the sodium d spectral line (i.e., 0.58756 micron). The column headed $V_d$ refers to the Abbe number for the lens element bounded on the left by that surface. The index of refraction of an optical material varies with wavelength. The indices of refraction for the two different materials comprising the solid and liquid lens elements of the lens system indicated, at five representative wavelengths (i.e., $N_1$ at 1.00 micron, $N_2$ at 0.90 micron, $N_3$ at 1.50 micron, $N_4$ at 0.70 micron, $N_5$ at 2.50 micron) are tabulated as follows:

TABLE 10

| Material | $N_1$ | $N_2$ | $N_3$ | $N_4$ | $N_5$ |
|---|---|---|---|---|---|
| Sapphire | 1.755737 | 1.757772 | 1.747114 | 1.763252 | 1.726239 |
| Perfluoromethyldecalin | 1.313807 | 1.314319 | 1.312021 | 1.315813 | 1.307735 |

The lens system of the embodiment indicated has been evaluated above for each of the above-specified wavelengths. In particular, a graphical indication of performance of the lens system at the particular wavelengths as been provided by a plot of optical path difference as a function of normalized aperture height for the specified wavelength. As shown above, plots of optical path difference as a function of normalized aperture height are shown for the indicated lens system for each of the same five wavelengths for which indices of refraction are tabulated. It can be determined from the curves plotted that the maximum optical path difference for the lens system shown throughout the selected range of wavelengths is less than 0.074 waves at any point on the aperture. Further shown above, the root-mean-square (rms) wavefront error of the lens system shown has been plotted throughout a selected portion of the infrared spectrum. According to the information shown, the lens system is well corrected throughout the selected range of the infrared spectrum.

Sixth Embodiment

FIG. 16 shows a profile drawing of another embodiment of the present invention, which comprises a lens arrangement 118 including first and second solid lens elements 120 and 121 respectively, each of which is made of fused silica. The fused silica lens elements can be obtained from, e.g., Heraeus Amersil, Inc. of Duluth, Ga. Lens arrangement 118 includes a fixture 125 in which are coaxially mounted lens elements 120 and 121 with a flexible material 125', such as fluorosilicone for example, along a common optic axis. Lens arrangement 118 further includes a liquid element 126 contained within fixture 125. The liquid element according to the present embodiment is perfluoromethyldecalin. According to the United States Mil Spec system for identifying optical materials, perfluoromethyldecalin is identified by the code designation "312.02."

FIG. 17 is a plot of the optical path difference versus the normalized aperture height for five selected wavelengths, showing that the maximum wavefront error for any one of the plotted wavelengths is less than 0.078 wavelengths for the embodiment of FIG. 16. FIG. 18 is a plot of rms wavefront error for the embodiment of FIG. 16, versus wavelength for an ultraviolet wavelength range from 0.70 to 2.50 microns. As indicated, for the embodiment of FIG. 16, the rms wavefront error is less than 0.0228 wave, and the average rms wavefront error is 0.0062 wave, over the range from 0.70 to 2.50 micron.

The lens arrangement shown in FIG. 16 has an optical prescription (i.e., a design form) specified in tabular form as follows:

TABLE 11

| Surface No. | Radius (inches) | Thickness (inches) | $N_d$ | $V_d$ | Material |
|---|---|---|---|---|---|
| 1 | 0.426680 | 0.013654 | 1.458464 | 67.82 | Fused Silica |
| 2 | 0.431253 | 0.007500 | 1.317242 | 102.26 | 312.02 |
| 3 | −0.282821 | 0.013654 | 1.458464 | 67.82 | Fused Silica |
| 4 | −0.603774 | 0.983335 | | | Air | where the surfaces of the lens elements are numbered consecutively from left to right along the optic axis in accordance with optical design convention. Thus, surface No. 1 is the left surface of the first solid lens element. Surface No. 2 is both the right surface of the first solid element and the left surface of the liquid lens element. Surface No. 3 is both the right surface of the liquid lens element and the left surface of the second solid lens element. The aperture stop is at surface No. 1. The radius listed for each lens surface in the table above is the radius of curvature expressed in inches. In accordance with convention, the radius of curvature is positive if the center of curvature of the surface lies to the right of the surface, and negative if the center of curvature of the surface lies to the left of the surface. The thickness listed for each lens surface is the thickness expressed in inches of the lens element bounded on the left by the surface. The thickness of each lens element is measured along the optic axis. The column headed $N_d$ in the table refers to the index of refraction of the lens element bounded on the left by the indicated surface at the wavelength of the sodium d spectral line (i.e., 0.58756 micron). The column headed $V_d$ refers to the Abbe number for the lens element bounded on the left by that surface. The index of refraction of an optical material varies with wavelength. The indices of refraction for the two different materials comprising the solid and liquid lens elements of the lens system indicated, at five representative wavelengths (i.e., $N_1$ at 1.00 micron, $N_2$ at 0.90 micron, $N_3$ at 1.50 micron, $N_4$ at 0.70 micron, $N_5$ at 2.50 micron) are tabulated as follows:

TABLE 12

| Material | $N_1$ | $N_2$ | $N_3$ | $N_4$ | $N_5$ |
|---|---|---|---|---|---|
| Fused Silica | 1.450417 | 1.451754 | 1.444618 | 1.455293 | 1.429802 |
| Perfluoromethyldecalin | 1.313807 | 1.314319 | 1.312021 | 1.315813 | 1.307735 |

The lens system of the embodiment indicated has been evaluated above for each of the above-specified wavelengths. In particular, a graphical indication of performance of the lens system at the particular wavelengths as been provided by a plot of transverse ray error as a function of normalized aperture height for each indicated wavelength. Further, plots of transverse ray error as a function of normalized aperture height have been shown for the indicated lens system for each of the five wavelengths for which indices of refraction are listed in the above table. The curves in the indicated figure are extremely close to each other at all points on the aperture, which indicates that the lens system exhibits substantially uniform performance throughout the particular wavelength range indicated. Another graphical indication of performance of a lens system at a specified wavelength is provided by a plot of optical path difference as a function of normalized aperture height for the specified wavelength. As shown above, plots of optical path difference as a function of normalized aperture height are shown for the indicated lens system for each of the same five wavelengths for which indices of refraction are tabulated. It can be determined from the curves plotted that the maximum optical path difference for the lens system shown throughout the selected range of wavelengths is less than 0.078 waves at any point on the aperture. Further shown above, the root-mean-square (rms) wavefront error of the lens system shown has been plotted throughout a selected portion of the infrared spectrum. According to the information shown, the lens system is well corrected throughout the selected range of the infrared spectrum.

The present invention has been described above in terms of certain exemplary embodiments. However, practitioners skilled in the art of optical design, after having perused the foregoing description and the accompanying drawing, could readily develop design forms for other embodiments without departing from the scope of the present invention. Therefore, the present invention is defined more generally by the following claims and their equivalents.

What is claimed is:

1. A lens system comprising a first rigid lens element, a second rigid lens element and a liquid lens element, said liquid lens element being contained between said first and second rigid lens elements, said first and second rigid lens elements and said liquid lens element co-acting with each other to cause said lens system to have rms wavefront error of less than 0.1 over a continuous infrared wavelength band.

2. The lens system according to claim 1 wherein said first and second rigid lens elements are made of solid material having infrared transparency.

3. The lens system according to claim 2 wherein said liquid lens element is made of a liquid having infrared transparency.

4. A lens system comprising a first rigid lens element, a second rigid lens element and a liquid lens element, said liquid lens element being contained between said first and second rigid lens elements, said first and second rigid lens elements and said liquid lens element co-acting with each other to cause said lens system to have rms wavefront error of less than 0.1 over a continuous infrared wavelength band; wherein said first and second rigid lens elements are made of solid material having infrared transparency; wherein said liquid lens element is made of a liquid having infrared transparency; and wherein said liquid lens element is made of carbon tetrachloride, and said first and second rigid lens elements are made of a material selected from a group consisting of sapphire and fused silica.

5. A lens system comprising a first rigid lens element, a second rigid lens element and a liquid lens element, said liquid lens element being contained between said first and second rigid lens elements, said first and second rigid lens elements and said liquid lens element co-acting with each other to cause said lens system to have rms wavefront error less than 0.1 over a continuous infrared wavelength band; wherein said first and second rigid lens elements are made of solid material having infrared transparency; wherein said liquid lens element is made of a liquid having infrared transparency and wherein said first and second rigid lens elements and said liquid lens element are configured and positioned with respect to each other according to a design form specified as follows:

| Surface No. | Radius (inches) | Thickness (inches) | $N_d$ | $V_d$ | Material |
|---|---|---|---|---|---|
| 1 | 2.408983 | 0.014031 | 1.768239 | 72.01 | Sapphire |
| 2 | −6.241043 | 0.004845 | 1.459453 | 48.75 | 459487 |
| 3 | −0.265632 | 0.014031 | 1.768239 | 72.01 | Sapphire |
| 4 | −0.424980 | 1.001170 | | | Air | wherein the surfaces of the optic elements are numbered consecutively from left to right along the optic axis, $N_d$ is the index of refraction at the wavelength of the sodium spectral line, and $V_d$ is the Abbe number at the same wavelength.

6. A lens system comprising a first rigid lens element, a second rigid lens element and a liquid lens element, said liquid lens element being contained between said first and second rigid lens elements, said first and second rigid lens elements and said liquid lens element co-acting with each other to cause said lens system to have rms wavefront error of less than 0.1 over a continuous infrared wavelength band; wherein said first and second rigid lens elements are made of solid material having infrared transparency; wherein said liquid lens element is made of a liquid having infrared transparency; and wherein said first and second rigid lens elements and said liquid lens element are configured and positioned with respect to each other according to a design form specified as follows:

| Surface No. | Radius (inches) | Thickness (inches) | $N_d$ | $V_d$ | Material |
|---|---|---|---|---|---|
| 1 | 1.358504 | 0.013810 | 1.458464 | 67.82 | Fused Silica |
| 2 | −0.489942 | 0.004676 | 1.459453 | 48.75 | 459487 |
| 3 | −0.187082 | 0.013810 | 1.458464 | 67.82 | Fused Silica |
| 4 | −0.668690 | 0.988123 | | | Air | wherein the surfaces of the optic elements are numbered consecutively from left to right along the optic axis, $N_d$ is the index of refraction at the wavelength of the sodium spectral line, and $V_d$ is the Abbe number at the same wavelength.

7. A lens system comprising a first rigid lens element, a second rigid lens element and a liquid lens element, said liquid lens element being contained between said first and second rigid lens elements, said first and second rigid lens elements and said liquid lens element co-acting with each other to cause said lens system to have rms wavefront error of less than 0.1 over a continuous infrared wavelength band; wherein said first and second rigid lens elements are made of solid material having infrared transparency; wherein said liquid lens element is made of a liquid having infrared transparency; and wherein said liquid lens element is made of hexane, and said first and second rigid lens elements are made of a material selected from a group consisting of sapphire and fused silica.

8. A lens system comprising a first rigid lens element, a second rigid lens element and a liquid lens element, said liquid lens element being contained between said first and second rigid lens elements, said first and second rigid lens elements and said liquid lens element co-acting with each other to cause said lens system to have rms wavefront error of less than 0.1 over a continuous infrared wavelength band; wherein said first and second rigid lens elements are made of solid material having infrared transparency; wherein said liquid lens element is made of a liquid having infrared transparency; and wherein said first and second rigid lens elements and said liquid lens element are configured and positioned with respect to each other according to a design form specified as follows:

| Surface No. | Radius (inches) | Thickness (inches) | $N_d$ | $V_d$ | Material |
|---|---|---|---|---|---|
| 1 | 4.784631 | 0.013722 | 1.768239 | 72.01 | Sapphire |
| 2 | −0.833969 | 0.004738 | 1.375217 | 58.03 | 375580 |
| 3 | −2.427737 | 0.013722 | 1.768239 | 72.01 | Sapphire |
| 4 | −1.395965 | 0.993165 | | | Air | wherein the surfaces of the optic elements are numbered consecutively from left to right along the optic axis, $N_d$ is the index of refraction at the wavelength of the sodium spectral line, and $V_d$ is the Abbe number at the same wavelength.

9. A lens system comprising a first rigid lens element, a second rigid lens element and a liquid lens element, said liquid lens element being contained between said first and second rigid lens elements, said first and second rigid lens elements and said liquid lens element co-acting with each other to cause said lens system to have rms wavefront error of less than 0.1 over a continuous infrared wavelength band; wherein said first and second rigid lens elements are made of solid material having infrared transparency; wherein said liquid lens element is made of a liquid having infrared transparency; and wherein said first and second rigid lens elements and said liquid lens element are configured and positioned with respect to each other according to a design form specified as follows:

| Surface No. | Radius (inches) | Thickness (inches) | $N_d$ | $V_d$ | Material |
|---|---|---|---|---|---|
| 1 | 0.724396 | 0.013654 | 1.458464 | 67.82 | Fused Silica |
| 2 | −4.508088 | 0.004623 | 1.375217 | 58.03 | 375580 |
| 3 | 1.930710 | 0.013654 | 1.458464 | 67.82 | Fused Silica |
| 4 | −1.394357 | 0.986876 | | | Air | wherein the surfaces of the optic elements are numbered consecutively from left to right along the optic axis, $N_d$ is the index of refraction at the wavelength of the sodium spectral line, and $V_d$ is the Abbe number at the same wavelength.

10. A lens system comprising a first rigid lens element, a second rigid lens element and a liquid lens element, said liquid lens element being contained between said first and second rigid lens elements, said first and second rigid lens elements and said liquid lens element co-acting with each other to cause said lens system to have rms wavefront error of less than 0.1 over a continuous infrared wavelength band; wherein said first and second rigid lens elements are made of solid material having infrared transparency; wherein said liquid lens element is made of a liquid having infrared transparency; and wherein said liquid lens element is made of perfluoromethyldecalin, and said first and second rigid lens elements are made of a material selected from a group consisting of sapphire and fused silica.

11. A lens system comprising a first rigid lens element, a second rigid lens element and a liquid lens element, said liquid lens element being contained between said first and second rigid lens elements, said first and second rigid lens elements and said liquid lens element co-acting with each other to cause said lens system to have rms wavefront error of less than 0.1 over a continuous infrared wavelength band; wherein said first and second rigid lens elements are made of solid material having infrared transparency; wherein said liquid lens element is made of a liquid having infrared transparency; and wherein said first and second rigid lens elements and said liquid lens element are configured and positioned with respect to each other according to a design form specified as follows:

| Surface No. | Radius (inches) | Thickness (inches) | $N_d$ | $V_d$ | Material |
|---|---|---|---|---|---|
| 1 | 0.579185 | 0.014015 | 1.768239 | 72.01 | Sapphire |
| 2 | 0.465793 | 0.009988 | 1.317242 | 102.26 | 312.02 |
| 3 | −0.206232 | 0.014015 | 1.768239 | 72.01 | Sapphire |
| 4 | −0.275157 | 1.000413 | | | Air | wherein the surfaces of the optic elements are numbered consecutively from left to right along the optic axis, $N_d$ is the index of refraction at the wavelength of the sodium spectral line, and $V_d$ is the Abbe number at the same wavelength.

12. A lens system comprising a first rigid lens element, a second rigid lens element and a liquid lens element, said liquid lens element being contained between said first and second rigid lens elements, said first and second rigid lens elements and said liquid lens element co-acting with each other to cause said lens system to have rms wavefront error of less than 0.1 over a continuous infrared wavelength band; wherein said first and second rigid lens elements are made of solid material having infrared transparency; wherein said liquid lens element is made of a liquid having infrared transparency; and wherein said first and second rigid lens elements and said liquid lens element are configured and positioned with respect to each other according to a design form specified as follows:

| Surface No. | Radius (inches) | Thickness (inches) | $N_d$ | $V_d$ | Material |
|---|---|---|---|---|---|
| 1 | 0.426680 | 0.013654 | 1.458464 | 67.82 | Fused Silica |
| 2 | 0.431253 | 0.007500 | 1.317242 | 102.26 | 312.02 |
| 3 | −0.282821 | 0.013654 | 1.458464 | 67.82 | Fused Silica |
| 4 | −0.603774 | 0.983335 | | | Air | wherein the surfaces of the optic elements are numbered consecutively from left to right along the optic axis, $N_d$ is the index of refraction at the wavelength of the sodium spectral line, and $V_d$ is the Abbe number at the same wavelength.

* * * * *